United States Patent Office 3,005,009
Patented Oct. 17, 1961

3,005,009
BIS(DIHYDROCARBYLOXYPHOSPHINYLOXO-
METHYL)DISULFIDES AND METHODS FOR
PREPARING THE SAME
Samuel Allen Heininger, Warson Woods, Mo., and Daniel
W. Grisley, Jr., Dayton, Ohio, assignors to Monsanto
Chemical Company, St. Louis, Mo., a corporation of
Delaware
No Drawing. Filed Aug. 10, 1959, Ser. No. 832,425
6 Claims. (Cl. 260—461)

This invention relates to organic phosphorus compounds containing sulfur. In one respect, this invention relates to bis(dihydrocarbyloxyphosphinyloxomethyl)disulfides as new compounds. In another respect, this invention relates to methods for preparing bis(dihydrocarbyloxyphosphinyloxomethyl)disulfides from alkali metal dihydrocarbyloxyphosphinyl thioformates.

Numerous organic compounds containing both sulfur and phosphorus atoms are known to exist and to have a considerable commercial value in a great variety of useful applications. For example, the alkali metal dihydrocarbyloxyphosphinyl thioformates have been found to be useful in preparing biological toxicant compositions. These thioformates and their method of preparation from the alkali metal hydrogen phosphite diesters by reaction with carbonyl sulfide are disclosed and claimed in copending application Serial No. 832,424, filed August 10, 1959, by Grisley, Heininger and Birum.

We have discovered that new organic phosphorus compounds containing sulfur are formed when alkali metal dihydrocarbyloxyphosphinyl thioformates are subjected to the action of a mild oxidizing agent.

An object of this invention is to provide bis(dihydrocarbyloxyphosphinyloxomethyl)disulfides as new compounds.

Another object of this invention is to provide methods for oxidizing alkali metal dihydrocarbyloxyphosphinyl thioformates to form bis(dihydrocarbyloxyphosphinyloxomethyl)disulfides.

Other aspects, objects and advantages of the invention are apparent from a consideration of the accompanying disclosure and the appended claims.

According to the present invention, alkali metal dihydrocarbyloxyphosphinyl thioformates are subjected to the action of mild oxidizing agents selected from the group consisting of bromine, iodine, hydrogen peroxide, ferric chloride, sulfuryl chloride, and nitrogen dioxide to form a disulfide of said alkali metal dihydrocarbyloxyphosphinyl thioformate. The reaction involved in this invention can be illustrated by the following equation using iodine as the oxidizing agent:

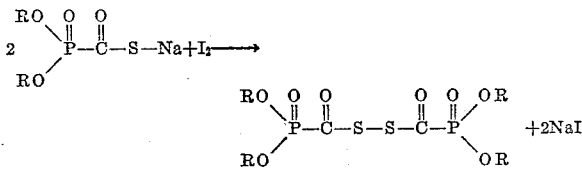

wherein R is an hydrocarbyl radical containing from 1 to 12 carbon atoms selected from the group consisting of alkyl, aryl, alkaryl and aralkyl radicals, and Na is sodium. The expression "hydrocarbyl" as used herein and in the appended claims refers to the radical obtained by the removal of a hydrogen atom from any hydrocarbon.

Further, according to the present invention, there are provided, as new compounds, bis(dihydrocarbyloxyphosphinyloxomethyl)disulfides of the formula

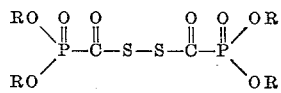

wherein R is an hydrocarbyl radical containing from 1 to 12 carbon atoms selected from the group consisting of alkyl, aryl, alkaryl and aralkyl radicals.

The alkali metal dihydrocarbyloxyphosphinyl thioformate reactants employed in the reaction of this invention can be any sodium, potassium or lithium salts of the dihydrocarbyloxyphosphinyl thioformic acids wherein said hydrocarbyl radicals are substantially free of acetylenic unsaturation and contain from 1 to 12 carbon atoms. Suitable hydrocarbyl radicals include the alkyl, aryl, alkaryl and aralkyl radicals. The preparation of these alkali metal dihydrocarbyloxyphosphinyl thioformate reactants is disclosed in the above-identified application of Grisley, Heininger and Birum. Preferably, these reactants are prepared by reacting alkali metal salts of hydrocarbylphosphite diesters with carbonyl sulfide; however, this invention is not limited by the method by which the alkali metal dihydrocarbyloxyphosphinyl thioformates are prepared.

Illustrative examples of the alkali metal dihydrocarbyloxyphosphinyl thioformates used as reactants in the present invention are as follows: sodium, potassium, or lithium diethoxyphosphinyl thioformates; sodium, potassium, or lithium dimethoxyphosphinyl thioformates; sodium, potassium, or lithium dioctoxyphosphinyl thioformates; sodium, potassium or lithium dibutoxyphosphinyl thioformates; sodium, potassium or lithium diphenoxyphosphinyl thioformates; and sodium, potassium or lithium dibenzyloxyphosphinyl thioformates.

The oxidizing agent employed in the reaction of this invention can be any of the mild oxidizing agents known to those skilled in the art. Some examples of suitable oxidizing agents include bromine, iodine, hydrogen peroxide, ferric chloride, sulfuryl chloride, and nitrogen dioxide. Other mild oxidizing agents can also be used in the process of this invention to effect the formation of the disulfide from the dihydrocarbyloxyphosphinyl thioformates.

The oxidation of alkali metal dihydrocarbyloxyphosphinyl thioformate is very exothermic so that this reaction is normally conducted in an inert solvent medium utilizing external cooling. Usually, the oxidation is carried out at a temperature within the range of from —40° C. to +40° C.; however, lower or higher temperatures can be used depending upon the freezing point of the solvent and the efficiency of the external cooling. Although the oxidation can be carried out at atmospheric pressure as well as at subatmospheric pressure, slightly elevated pressures are employed when the oxidation is carried out at higher temperatures in order to reduce decomposition of the alkali metal dihydrocarbyloxyphosphinyl thioformate reactant. However, elevated pressures and catalysts are not ordinarily required in conducting the oxidation step. The diluent or inert solvent should be one in which the alkali metal dihydrocarbyloxyphosphinyl thioformate is soluble, such as dioxane, diethylcarbitol and tetrahydrofuran; however, other solvents in which the thioformate is merely suspended, such as benzene, toluene, hexane, diethyl ether, and the like, can also be used. The solvent selected must also have a low freezing point so as to permit the oxidation to be carried out at depressed temperatures. Preferably, the solvent is one in which the disulfide product is insoluble so as to permit the product to be readily separated and recovered.

The reaction of this invention is normally conducted employing stoichiometric proportions of the thioformate and the oxidizing agent; that is, 2 moles of the dihydrocarbyloxyphosphinyl thioformate and 1 mole of an oxidizing agent such as iodine. A stoichiometric excess of either reactant can also be used; however, this method of operation is uneconomical where a large excess of one reactant is used. Usually, the reaction is conducted by contacting the thioformate reactant dissolved or suspended in a diluent or solvent with the slow addition of the oxidizing agent in small amounts so that the thioformate is in excess in the initial stages of the reaction. Then, the addition of the oxidizing agent is continued until a stoichiometric proportion of the oxidizing agent has been added. The completion of the reaction can be readily determined by observing the temperature of the reaction mixture since the reaction is complete when there is no further increase in temperature due to the exothermic heat of reaction.

Illustrative examples of the bis(dihydrocarbyloxyphosphinyloxomethyl)disulfides provided by the invention are:

bis(dimethoxyphosphinyloxomethyl)disulfide,
bis(disbutoxyphosphinyloxomethyl)disulfide,
bis(ethoxyphosphinyloxomethyl)disulfide,
bis(octoxyphosphinyloxomethyl)disulfide,
bis(diphenoxyphosphinyl)disulfide, and
bis(dibenzyloxyphosphinyloxomethyl)disulfide.

The bis(dihydrocarbyloxyphinyloxomethyl)disulfide compounds provided by the invention are stable compounds which range from viscous liquids to waxy solids. They are generally colorless; however, they may possess some light coloration. These compounds may be advantageously employed as additives in high pressure lubricants to impart extreme pressure resistant properties thereto. These compounds also exhibit herbicidal activity when applied to the foliage of plants. For example, bis-diethoxyphosphinyloxomethyl)disulfide had a very severe effect on bean plants when applied at a concentration of 0.50%. This compound also had a moderate effect on broad leaf plants and a slight effect on grass plants when applied at the same concentration.

The advantages, desirability and usefulness of the new compounds of this invention are illustrated by the following example. In this example, bis(diethoxyphosphinyl-oxomethyl)disulfide was prepared using iodine as an oxidizing agent. A tetrahydrofuran solution of iodine containing 43.2 g. of iodine and 330 ml. of tetrahydrofuran was slowly added to a tetrahydrofuran solution of sodium diethoxyphosphinyl thioformate containing 35.0 g. of the thioformate dissolved in 130 ml. of the tetrahydrofuran. The reaction mixture was maintained at 0° C. by external cooling with ice. After the addition of 50 ml. of the iodine solution, the reaction mixture became dark orange in color, but the addition of an additional 30 ml. of iodine solution resulted in the formation of a colorless mixture. The further addition of 100 ml. of the iodine solution caused the mixture to assume a permanently dark purple color. At this time, the ice bath was removed and the remainder of the iodine solution was added slowly with the temperature of the reaction increasing to 40° C. The reaction mixture was then cooled to room temperature and stirred for an additional 1.5 hours. At the end of this time, the reaction mixture was evaporated at 40° C. under a pressure of 20 mm. to yield a semi-solid product. This product was triturated with several portions of chloroform. The triturate was recovered, filtered, and evaporated in vacuo to yield 16 g. of a viscous, colorless oil, bis(diethoxyphosphinyloxomethyl)disulfide. The hydrogen and phosphorus contents of the product were found to be 5.61% and 16.00%, respectively, as compared to calculated values of 5.11% and 15.77%, respectively.

Reasonable variation and modification of the invention as described are possible, the essence of which is that there have been provided bis(dihydrocarbyloxyphosphinyloxomethyl)disulfides as new compounds and methods for preparing the same by oxidizing alkali metal dihydrocarbyloxyphosphinyl thioformates.

We claim:

1. An organic phosphorus compound of the formula

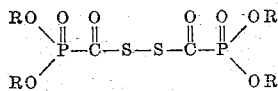

wherein R is an hydrocarbyl radical substantially free of acetylenic unsaturation containing from 1 to 12 carbon atoms selected from the group consisting of alkyl, aryl, alkaryl, and aralkyl radicals.

2. Bis(diethoxyphosphinyloxomethyl)disulfide.

3. The method which comprises oxidizing an alkali metal dihydrocarbyloxyphosphinyl thioformate by contacting with a mild oxidizing agent, said hydrocarbyl radical being substantially free of acetylenic unsaturation and containing from 1 to 12 carbon atoms selected from the group consisting of alkyl, aryl, alkaryl, and aralkyl radicals, and recovering a bis(dihydrocarbyloxyphosphinyloxomethyl)disulfide as product.

4. The method which comprises oxidizing an alkali metal dihydrocarbyloxyphosphinyl thioformate, said hydrocarbyl radical being substantially free of acetylenic unsaturation and containing from 1 to 12 carbon atoms selected from the group consisting of alkyl, aryl, alkaryl, and aralkyl radicals, with a mild oxidizing agent selected from the group consisting of bromine, iodine, hydrogen peroxide, ferric chloride, sulfuryl chloride, and nitrogen dioxide and recovering a bis(dihydrocarbyloxyphosphinyloxomethyl)disulfide as product.

5. The method which comprises oxidizing an alkali metal dihydrocarbyloxyphosphinyl thioformate of the formula

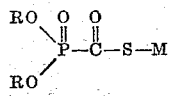

wherein R is an hydrocarbyl radical substantially free of acetylenic unsaturation containing from 1 to 12 carbon atoms selected from the group consisting of alkyl, aryl, alkaryl, and aralkyl radicals and M is an alkali metal selected from the group consisting of sodium, potassium and lithium with an oxidizing agent selected from the group consisting of bromine, iodine, hydrogen peroxide, ferric chloride, sulfuryl chloride, and nitrogen dioxide and recovering as product a bis(dihydrocarbyloxyphosphinyloxomethyl)disulfide of the formula

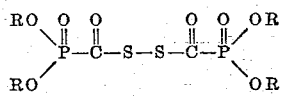

wherein R is as above defined.

6. The method which comprises oxidizing diethoxyphosphinyl thioformate with iodine and recovering bis(diethoxyphosphinyloxomethyl)disulfide as product.

No references cited.